Nov. 14, 1950   E. P. EVERS   2,530,294
TRIPOD HEAD FOR CAMERAS AND THE LIKE
Filed March 14, 1949

INVENTOR.
Edward P. Evers.

Patented Nov. 14, 1950

2,530,294

UNITED STATES PATENT OFFICE 2,530,294

TRIPOD HEAD FOR CAMERAS AND THE LIKE

Edward P. Evers, Overland, Mo.

Application March 14, 1949, Serial No. 81,367

8 Claims. (Cl. 248—183)

1

This invention pertains to tripod heads for cameras and like instruments, and more particularly to the type by which pan and tilt movements may be given to the instrument supported thereby.

One of the objects of this invention is to provide such a head of improved construction whereby pan and tilt movements may be controlled singly or simultaneously by a single handle, which handle may also be manipulated to lock those movements.

Another object is to provide such a head with improved locking means so that a solid camera-supporting head may be used as distinguished from a split head, which weakens the structure.

Another object is to provide a simple and robust construction which is cheap to manufacture.

Further objects will appear from the following description in which will be set forth an illustrative embodiment of this invention. It is understood, however, that this invention is susceptible of various embodiments, within the scope of the appended claims, without departing from the principles or spirit of the invention.

In accordance with this invention, generally stated, the camera-supporting head is rockably mounted on a trunnion member which, in turn, is pivotally mounted on an upright pivot member on a base which may be secured to the tripod. The trunnion and pivot members are mutually interlocked by one or more intermeshing ridges and grooves, such as a screw thread, on which the pivotal movement may be had. The trunnion member is made collapsible, as by splitting the same, so that it may be clamped on the pivot. The clamping action is secured by a separate clamping ring secured on the head and embracing the trunnion member. This clamping ring is split and is clamped on the trunnion member by a screw operated by the manipulating handle, by which the pan and tilt movements are also imparted. Operation of the clamping ring clamps the head on the trunnion member, which latter is collapsed thereby to grip the pivot member, thereby clamping both pan and tilt movements.

Figure 1:
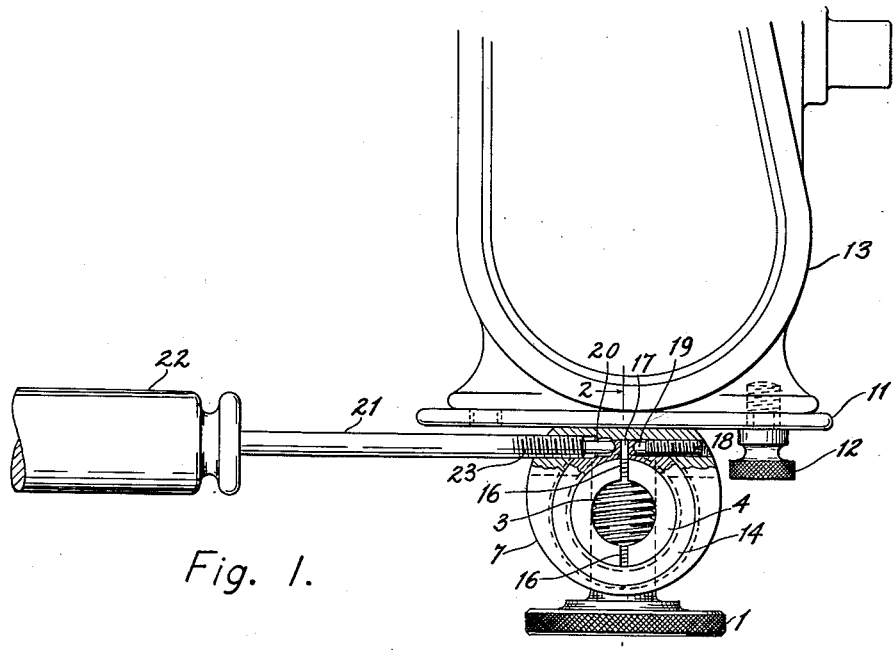
Figures 2, 3:
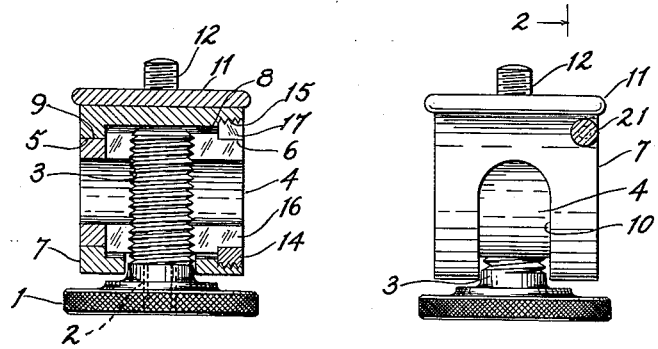
Figure 4:
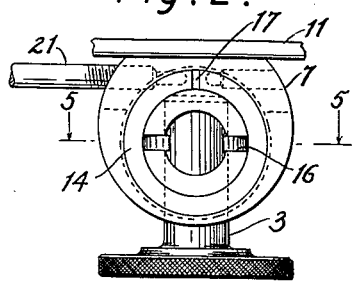
Figure 5:
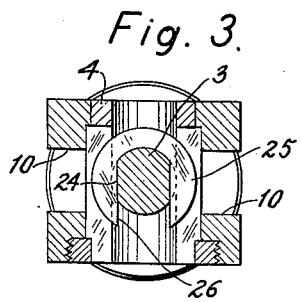

An illustrative embodiment of this invention is shown in the accompanying drawing in which Figure 1 is a side view, with parts in section, of a tripod head embodying this invention, Figure 2 is a section on line 2—2 of Fig. 1, Figure 3 is a view from the left-hand side of Fig. 1 with the shank of the handle shown in section, Figure 4 is a partial side view, similar to Fig. 1, showing another embodiment of this invention, and Figure 5 is a section on line 5—5 of Fig. 4.

Referring to the drawing, 1 designates a base provided with means, such as a tripod-screw socket 2, for securing it on a tripod or other support. The base 1 is provided with an upright pivot member 3 which may be threaded as shown in Figs. 1, 2 and 3. A trunnion member 4 is generally cylindrical in form and has its end portions reduced in diameter as indicated at 5 and 6. A supporting head 7 is formed with a horizontal bore 8 to receive the trunnion member 4, with a reduced portion 9 fitting the portion 5 of the member 4 to provide a trunnion bearing therefor. The head 7 is formed with a clearance gap 10 extending around the lower part thereof to clear the pivot 3 as the head rocks on the trunnion member. The head 7 may further be provided with camera-supporting means, such as a top plate 11, welded, brazed or otherwise fixed to the head 7, which plate may be provided with suitable means, as a screw 12, for mounting a camera 13 thereon.

The reduced portion 6 of the trunnion member has a bearing in a split ring 14 which is secured on the head 7. In the embodiment shown the ring 14 is mounted in the head 7 by means of a thread 15 which is loose enough to permit the ring to turn therein. The ring 14 thus serves both as a trunnion bearing and to retain the head 7 on the trunnion member. The latter member is rendered collapsible by an axial slot 16 extending part way therethrough as shown in Fig. 2. The ring 14 is split at one point thereof as indicated at 17 to render it collapsible as a clamping ring.

Threaded in the head 7 to extend tangentially with relation to the ring 14 is a stop screw 18 having a reduced tip 19 seated in a socket formed in the ring 14 on one side of the split 17 as shown in Fig. 1. Seated in a similar socket on the other side of the split 17 is the reduced tip 20 of the shank 21 of a handle 22. The shank 21 is threaded at 23 to engage a complementary thread in the head 7.

It will be seen that by virtue of this construction, when the parts are loose, by moving the handle 22 up or down the head 7 is caused to rock on the trunnion member, thereby giving the camera 13 a tilting movement. By moving the handle sidewise the trunnion member is caused to pivot on the member 3, thereby imparting to the camera a panning movement. And these movements may be given singly or simultaneously. By turning the handle 22 on its axis the screw 23 may be made to force the tip 20 inward to collapse the ring 14. This clamps the ring upon the reduced portion 6 of the trunnion member 4 which in turn is thereby collapsed by closure of the slot 16 so as to clamp the trunnion member upon the pivot 3. Thus the same manipulation of the handle 22 clamps both movements of the head 7.

In the embodiment shown in Figs. 4 and 5 the pivot member 3, instead of being threaded, is slotted on opposite sides thereof to produce a pair of flats indicated at 24, adapted to receive a split ring 25 having a central U-slot 26 fitting said flats. This ring is then received in the slot 16 of the trunnion member 4 and provides a ridge on the pivot on which the whole assembly may turn and which acts to retain said assembly on the pivot. When the ring 14 is collapsed to clamp the parts it collapses the trunnion member upon the ring 25 to lock the head against panning movement.

In assembling the device of Figs. 4 and 5 the trunnion member is first slipped into the head and the two are then slipped onto the pivot. After aligning the slot 16 with the flats 24 the ring 25 is slipped in at the open end of said slot, after which the pivot may be rotated 180° to the position of Fig. 5. The ring 14 is then screwed in and the other parts assembled as shown.

It will be seen that this invention provides a simple and compact structure for mounting a camera or like instrument on a tripod or other support in such a way as to provide freedom of movement for both tilting and panning, which movements are under the control of a single handle and which movements may both be locked by operation of a single manipulating element. It thus provides complete control while requiring the use of only one hand by the operator. As the parts are all of simple form the device may be manufactured at low cost.

Having thus described the invention, what is claimed is:

1. A tripod head of the character described, comprising, an upright pivot, a trunnion member solid at one end and collapsible at its other end, mounted to turn on said pivot, a solid head mounted to rock on said trunnion member and having camera-supporting means, and clamping means on said head engaging the collapsible portion of said trunnion member operable to clamp said head against movement on said trunnion member and said trunnion member against movement on said pivot.

2. A tripod head of the character described, comprising, an upright pivot, a collapsible trunnion member mounted to turn on said pivot, a solid head mounted to rock on said trunnion member and having camera-supporting means, a separate collapsible clamping ring removably mounted in said head and embracing said trunnion member, and means operating on said ring to clamp said head against movement on said trunnion member and said trunnion member against movement on said pivot.

3. A tripod head of the character described, comprising, an upright pivot, a unitary trunnion member split for part of its length and mounted to turn on said pivot, a solid head mounted to rock on said trunnion member and having camera-supporting means, a separate clamping ring removably mounted on said head and embracing the split end of said trunnion member, and a handle adapted for manipulating said head to turn the same on said pivot and to rock the same on said trunnion member and operable to actuate said clamping ring to clamp both said movements of said head.

4. A tripod head of the character described, comprising, an upright pivot member, a trunnion member mounted to turn on said pivot member, a solid head mounted to rock on said trunnion member and having camera-supporting means, a ridge formed on one of said members, a matching groove formed in the other of said members adapted to receive said ridge for movement thereon, and means for clamping said members against relative movement.

5. A tripod head of the character described, comprising, an upright pivot member, a collapsible trunnion member mounted to turn on said pivot member, a solid head mounted to rock on said trunnion member and having camera-supporting means, a ridge formed on one of said members, a matching groove formed in the other of said members adapted to receive said ridge for movement thereon, a separate clamping ring secured on said head and embracing said trunnion member, and a handle adapted for moving said head on one or both of said members and operable to actuate said clamping ring to clamp both said movements of said head.

6. A tripod head of the character described, comprising, a base having means for mounting the same on a tripod and having an upright threaded pivot member, a collapsible trunnion member threaded on said pivot member for pivotal movement thereon, a solid head mounted for rocking movement on said trunnion member, a clamping ring secured on said head and embracing said trunnion member, and means for actuating said clamping ring to lock said head against both said movements.

7. A tripod head of the character described, comprising, an upright pivot, a trunnion member mounted to turn on said pivot, said member having its end portions formed to provide trunnions and being split axially of said trunnions for a portion of its length leaving one end thereof solid, a solid head having a bore adapted to receive said member and provide a bearing for the solid trunnion thereof, and means on said head for retaining said member in said bore and for gripping said split trunnion to clamp said head against movement.

8. A tripod head of the character described, comprising, an upright pivot, a trunnion member mounted to turn on said pivot, said member having its end portions reduced to provide trunnions and being split axially of said trunnions for a portion of its length leaving one end thereof solid, a solid head having a bore adapted to receive said member with a reduced portion providing a bearing for the solid trunnion thereof, a collapsible clamping ring having a bore providing a bearing for the split trunnion of said member, said ring being secured in said head to retain said member therein, and means operable to collapse said ring to clamp said split trunnion.

EDWARD P. EVERS.

REFERENCES CITED

The following references are of record in the file of this patent:

UNITED STATES PATENTS

| Number | Name | Date |
| --- | --- | --- |
| 1,854,951 | Neuwirth | Apr. 19, 1932 |
| 2,143,606 | Mooney | Jan. 10, 1939 |
| 2,469,063 | Bliss | May 3, 1949 |
| 2,499,066 | Jacobson | Feb. 28, 1950 |